(12) United States Patent
Mahindra et al.

(10) Patent No.: US 9,369,391 B2
(45) Date of Patent: Jun. 14, 2016

(54) FLOW MANAGEMENT FOR DATA STREAMS OVER CELLULAR NETWORKS

(71) Applicant: NEC Laboratories America, Inc., Princeton, NJ (US)

(72) Inventors: Rajesh Mahindra, Highland Park, NJ (US); Sampath Rangarajan, Bridgewater, NJ (US); Honghai Zhang, Seattle, WA (US)

(73) Assignee: NEC Corporation (JP)

( * ) Notice: Subject to any disclaimer, the term of this patent is extended or adjusted under 35 U.S.C. 154(b) by 112 days.

(21) Appl. No.: 14/220,837

(22) Filed: Mar. 20, 2014

(65) Prior Publication Data

US 2014/0286164 A1 Sep. 25, 2014

Related U.S. Application Data

(60) Provisional application No. 61/803,927, filed on Mar. 21, 2013.

(51) Int. Cl.
| | |
|---|---|
| *H04L 12/801* | (2013.01) |
| *H04L 12/853* | (2013.01) |
| *H04L 12/851* | (2013.01) |
| *H04L 12/841* | (2013.01) |
| *H04L 12/823* | (2013.01) |

(52) U.S. Cl.
CPC ............ *H04L 47/19* (2013.01); *H04L 47/2416* (2013.01); *H04L 47/2433* (2013.01); *H04L 47/283* (2013.01); *H04L 47/32* (2013.01)

(58) Field of Classification Search
CPC ..... H04L 47/19; H04L 47/2416; H04L 47/32; H04L 47/283; H04L 47/2433; H04L 69/16; H04L 47/40; H04L 67/2809; H04L 67/28; H04L 67/2814; H04L 47/193; H04L 47/2408; H04W 28/0268; H04W 28/0263; H04W 88/16; H04W 72/1242; H04W 28/0289
See application file for complete search history.

(56) References Cited

U.S. PATENT DOCUMENTS

| | | | | |
|---|---|---|---|---|
| 2013/0329559 | A1* | 12/2013 | Cabrera | H04W 28/0289 370/235 |
| 2014/0040457 | A1* | 2/2014 | Agrawal | H04L 47/40 709/224 |
| 2014/0147100 | A1* | 5/2014 | Bakharov | G11B 27/034 386/282 |
| 2015/0009826 | A1* | 1/2015 | Ma | H04W 28/0268 370/235 |

OTHER PUBLICATIONS

Allot Communications "Traffic Management Solutions" <http://www.allot.com/traffic-management.html> Oct. 2013. (1 Page).

(Continued)

*Primary Examiner* — Yee Lam
(74) *Attorney, Agent, or Firm* — Joseph Kolodka

(57) ABSTRACT

Methods and systems for data flow control include establishing a first connection between a gateway and a network client responsive to a connection request from the network client; establishing a second connection between the gateway and a server specified by the connection request; determining a user class for the network client based on a level of network congestion detected at the gateway based on throughput and round-trip-time delays; modifying a data flow received at the gateway on the second connection to remove data from the flow based on the determined user class of the network client; and transmitting the modified data flow to the network client via the first connection.

14 Claims, 4 Drawing Sheets

(56) References Cited

OTHER PUBLICATIONS

Burza, M., et al. "Adaptive Streaming of MPEG-Based Audio/Video Content Over Wireless Networks" Journal of Multimedia, vol. 2, No. 2. Apr. 2007. pp. 17-27.

Kokku, R., et al. "Opportunistic Alignment of Advertisement Delivery With Cellular Basestation Overloads" Proceedings of the 9th International Conference on Mobile Systems, Applications, and Services. Jun. 2011. (14 Pages).

Liebl, G., et al. "Advancedwireless Multiuser Video Streaming Using the Scalable Video Coding Extensions of H.264/MPEG4-AVC" Proceedings of the 2006 IEEE International Conference on Multimedia and Expo, ICME 2006. Jul. 2006. pp. 625-628.

Lu, M., et al. "Video Streaming Over 802.11 WLAN With Content-Aware Adaptive Retry" Proceedings of the 2005 IEEE International Conference on Multimedia and Expo. Jul. 2005. (4 Pages).

Mahindra, R., et al. "Mesa: Farsighted Flow Management for Video Delivery in Broadband Wireless Networks" Third International Conference on Communication Systems and Networks, COMSNETS 2011. Jan. 2011. (10 Pages).

Openwave Mobility, "Mobile Video Optimization" <http://ownmobility.com/mobile-video-optimization> Mar. 2014. (2 Pages).

Zhang, H., et al. "Cross-Layer Optimization for Streaming Scalable Video Over Fading Wireless Networks" IEEE Journal on Selected Areas in Communications, vol. 28, No. 3, Apr. 2010. pp. 344-353.

\* cited by examiner

FLOW MANAGEMENT FOR DATA STREAMS OVER CELLULAR NETWORKS

RELATED APPLICATION INFORMATION

This application claims priority to provisional application Ser. No. 61/803,927, filed Mar. 21, 2013, and incorporated herein by reference in its entirety.

BACKGROUND

1. Technical Field

The present invention relates to data flow management and, more particularly, to management of video streams over cellular networks.

2. Description of the Related Art

Recent years have witnessed a significant increase in data traffic on cellular networks, especially in the form of videos. The increase of video traffic in proportion to network use, coupled with the scarcity of the frequency spectrum, often leads to congestion at the wireless links. For non-elastic traffic such as voice and streaming video, where on-time reception of data is important for maintaining a high quality of experience, admission control may be used for flow management.

Unlike voice traffic, however, admission control is much harder with video streaming due to several challenges. Firstly, most videos involve variable bitrate coding, leading to significantly different video frame sizes with time. Hence, pre-provisioning certain amount of resources for each video flow is either too conservative, leading to under-utilization of wireless resources, or too aggressive, leading to bad video quality for all users. Secondly, to add to the complexity of provisioning, channel capacity can fluctuate significantly with time. Specifically, after a certain number of flows have been admitted, the capacity might decrease due to interference, mobility, etc. Such capacity mismatch may adversely affect many or even all flows, depending on the scheduling policy used across the admitted flows.

One solution builds on the wireless resource virtualization paradigm. This solution admits a greater number of flows relative to the basestation capacity to ensure maximum basestation utilization in the presence of video and capacity fluctuations. However, there are still network conditions that cannot be handled, or could be handled more gracefully, than the existing solutions allow.

SUMMARY

A method for data flow control includes establishing a first connection between a gateway and a network client responsive to a connection request from the network client; establishing a second connection between the gateway and a server specified by the connection request; determining a user class for the network client based on a level of network congestion detected at the gateway based on throughput and round-trip-time delays; modifying a data flow received at the gateway on the second connection to remove data from the flow based on the determined user class of the network client; and transmitting the modified data flow to the network client via the first connection.

A system for data flow control includes a first network controller configured to establish a first connection between a gateway and a network client responsive to a connection request from the network client; a second network controller configured to establish a second connection between the gateway and a server specified by the connection request; a slice manager comprising a processor, configured to determine a user class for the network client based on a level of network congestion detected at the gateway based on throughput and round-trip-time delays and to modify a data flow received at the gateway on the second connection to remove data from the flow based on the determined user class of the network client, wherein the first network controller transmits the modified data flow to the network client via the first connection.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention implement a three-class flow management regime. Short flow users are separated into Regular, Drop, and Victim classes (or slices). A higher priority is assigned to users in the Regular slice, and different flow scheduling policies are chosen within slices to maximize the video quality for users. This provides joint soft admission control and scheduling.

Previous efforts to establish frame dropping in video have assumed that the video is carried over a user datagram protocol (UDP) connection, as such connections are intended to be tolerant of data loss. However, most popular video sites employ HTTP/TCP-based video streaming, and these ensure delivery of packets by automatically trying to resend packets that were not received. As a result, one cannot simply drop frames from a TCP connection, as the server will attempt to replace the missing data.

Figure 1:
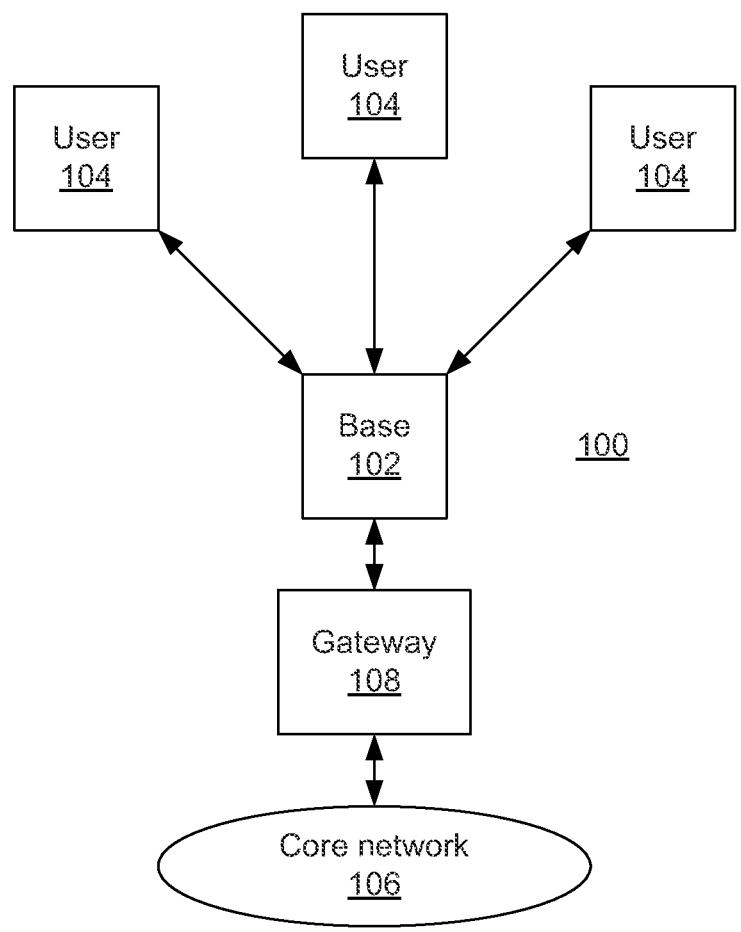
FIG. 1 is a block diagram of a radio access network having a flow control gateway in accordance with the present principles.

Referring now to the figures and initially to FIG. 1, a cellular network 100 is shown. A base station 102 serves as an intermediary between wireless user terminals 104 and a core network 106. The base station 102 communicates wirelessly with the users 104, providing requested data from the core network 106. If a high enough number of users 104 connect to the base station 102, the base station 102 may become saturated, such that it can no longer transmit all of the data that is requested. In this case, some data may be lost or delayed and users' quality of experience (QoE) may diminish.

The use of a Drop slice facilitates dropping low priority video frames for certain flows to maximize the total number of flows supported by a base station 102. When a base station 102 is congested, the present embodiments place certain flows in the Drop slice, where low priority frames of flows in the Drop slice are discarded to reduce congestion while maintaining the QoE for the users 104. If the overload in the base station 102 cannot be handled by video frame dropping alone, the present embodiments move certain flows to the Victim slice.

To accomplish this, the present embodiments enable video frame dropping with HTTP-based video streaming and implement a split http framework to split the end to end connection between the mobile and the video server at a mobile gateway 108. This framework enables dropping video frames of a flow without modifying the client or the server. By detecting congestion within the core network 106, as opposed to from within the radio access network defined by the base station 102, optimizations can be performed to prevent QoE degradation from within the core network 106. These optimizations can be computationally intensive, making it more appropriate to perform them at a central location. The present embodiments may also accommodate video codecs and formats in common use, such that users need not upgrade or change their software.

Figure 2:
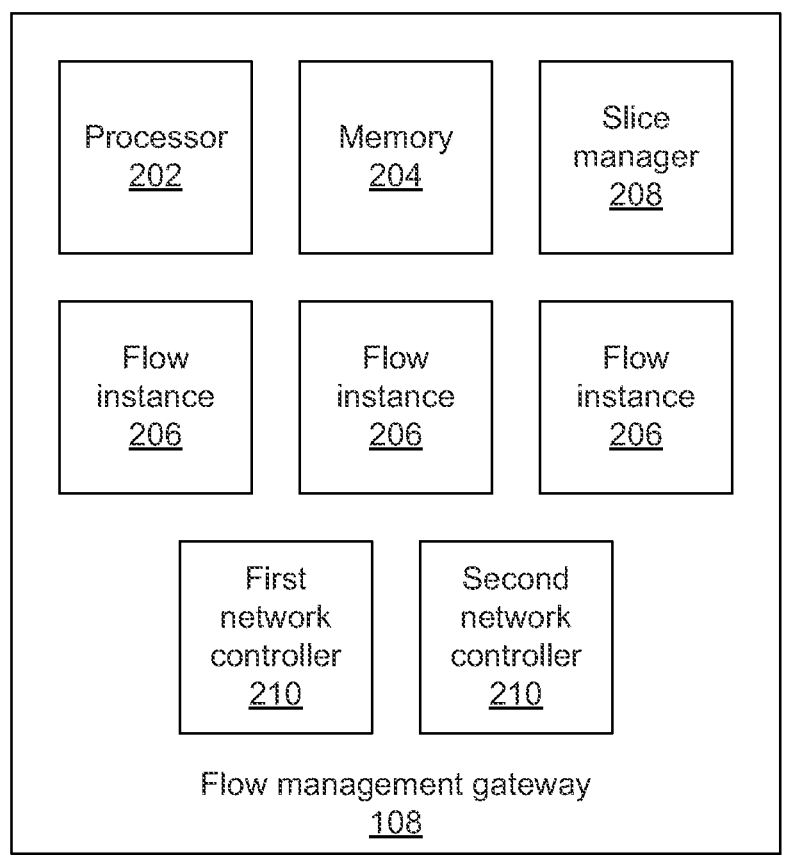
FIG. 2 is a block diagram of a flow control gateway in accordance with the present principles.

Referring now to FIG. 2, a gateway system 108 is shown. The present principles may be embodied as a gateway solution in the cellular operator's access network, external to the base station 102. The gateway 108 is a hardware device that includes a processor 202 and a memory 204. Since a gateway 108 handles traffic for multiple base stations 102, it hosts multiple flow instances 206, each instance handling traffic for one base station 102. To enable low-priority frame dropping, a flow instance 206 uses a split HTTP connection for every video flow. A slice manager 208 determines which slice a given flow should be in and applies the rules of the respective slice to the appropriate flows. A set of network controllers 210 provide network connections to different systems. For example, the first network controller 210 may connect to the base station 102, while the second network controller 210 may connect to the core network 106. It should be understood that the gateway 108 may include any number of network controllers and, hence, may connect to any number of discrete networks.

Among video flows, the slice manager 208 divides flows into three slices: Regular slice, Drop slice, and Victim slice. The slice manager 208 tries to allocate at least λ throughput to a flow in Regular slice. The quantity λ can be set based on a contract between a user and the operator or based on the minimum video rate needed to sustain a stall-free video for the user. Flows placed in the Drop slice receive X% of their share of λ. The value of X can be chosen by the operator depending on the savings desired during congestion periods. To maximize video quality for flows in Drop slice, appropriate numbers of low priority video frames are dropped to achieve a stall-free video experience for the user. When the slice manager 208 places a flow in Victim slice, the flow receives the residual capacity after flows in Regular and Drop slice have been satisfied. This effect may cause long stalls for the users placed in Victim slice. To ameliorate the effect, can employ opportunistic advertising for flows in Victim slice.

To enable this framework, the slice manager 208 employs per user queues and monitors the service rate and queue build-up for each user. If a Regular user's queue builds up above a threshold and its service rate falls below λ, some active users with minimum value of dissatisfaction metric $Z_j$ are moved to the Drop slice. After moving some percentage of total active flows into the Drop slice, if there still exists flows that cannot be supported in the Regular or the Drop slices, flows from the Drop slice with a minimum value of $Z_j$ are then migrated to the Victim slice. The goal of migration is to find the appropriate number of users in the Drop slice and Victim slice such that maximum users receive their share of traffic.

The slice manager 208 maintains a dissatisfaction metric to achieve uniformity across users. Every time a user is moved to the Drop slice, $Z_j$ is incremented by 0.5, and every time a user is moved to the Victim slice, $Z_j$ is incremented by 1. The user moved to Drop slice or Victim slice may be kept there for a fixed amount of time $V_t$. As an alternative, the user may be kept in the Drop slice or Victim slice for a length of time that depends on a degree of network congestion.

When a flow is in a Drop slice, the flow instance 206 drops some video frames when the wireless channel capacity is not sufficient. However, in practical Internet streaming systems, there are two obstacles to apply the frame dropping strategies. First, most existing Internet video applications use HTTP as the streaming protocol, which employs TCP as the transport protocol. TCP is an end-to-end reliable protocol, so if a video frame is dropped in the middle of the network, TCP will try to re-transmit the dropped packets until it succeeds, which will result in increased congestion. Second, some video container formats impose limitations on frame dropping.

To prevent TCP from re-transmitting the dropped video frames, the gateway 108 creates a split-HTTP connection for every video flow. This ensures that the gateway 108 can drop low-priority frames without explicit packet renumbering to maintain the end to end TCP connection. Moreover, typically a single TCP packet contains multiple video frames. The flow instances 206 implement the split HTTP logic by intercepting HTTP requests from clients 104 and sending its own request to the server on the network 106. Once the gateway 108 receives a response from the server, the flow instance 206 sends a response to the client 104, thus establishing a split HTTP connection. The flow instance 206 maintains two separate queues for each connection, one queue to receive packets from the server and an additional queue to send packets to the client 104. Maintaining separate queues allows the gateway 108 to enqueue sufficient packets from the server, enabling more efficient frame dropping. However, a common queue for the two connections can be employed as an alternative design choice.

Some video container formats impose limitations on frame dropping as well. Two representative video container formats are considered herein, but it should be understood that those having ordinary skill in the art would be able to apply the present principles to any appropriate format.

A first container format is flash video (FLV). FLV is one of the most popular video container formats in the Internet. Every FLV video consists of a short header, followed by a 4-byte previousTagSize field, with the first being zero. Then there is a sequence of tags followed by 4-byte previousTag-Size specifying the total size of the previous tag. A tag includes an 11-byte tag header and a tag body. The tag header contains the information about the tag type, body length, timestamp, and the stream id. The tag type indicates whether the tag contains a video frame, audio frame, or some metadata. Therefore, if a video frame has to be dropped, the entire tag is dropped, as well as the following PreviousTagSize field. When a video tag is dropped, the receiver can either skip to the next frame or perform interpolation based on the timestamp information in the previous and the next tags. Therefore, the flow instance 206 can safely drop individual video frames in an FLV video.

MPEG-4 Part 12 is a base-media format derived from Apple's Quick Time Format. Several popular video container formats, such as MP4, 3GP, 3GP2, F4V, are derived from MPEG-4 Part 12. In contrast to FLV, these formats are not amenable for frame dropping under typical configurations. The present principles provide a solution to this problem that applies to all formats derived from the MPEG-4 base media format, as the problem is caused by the base media format.

MP4 is an object-oriented media format. Each object is called a box. A box can contain other boxes. Except for a few top-level boxes, all other boxes must be contained in other boxes. A box starts with a box header including the size and the type of the box, followed by the body of the box. The format of the body of every box is specified in the MP4 standards. Among the top-level boxes, movie box (with type moov) and media data box (with type mdat) are the two most important ones. Media data box contains the interleaved media data such as video, audio, and meta information, and movie box contains the information about how the media data is interleaved. A movie box typically contains a video track and an audio track, specifying the location and size of the video and audio data in the media data box. The movie box can be viewed as the directory of the video or audio frames.

In a typical HTTP streaming system, the movie box is first transmitted and followed by the media box, since the former is required to parse the latter. If the movie box and part of the media box is transmitted, some video frames may then need to be dropped at an intermediate node. Although it is not difficult for the intermediate node to determine the frame boundary to drop the frame, this creates confusion at the receiver because it still has the video and audio interleaving information from the movie box containing all frames. For example, if a frame n is dropped at the middle box and a subsequent frame n+1 is transmitted, the receiver does not know frame n is dropped, so it will treat frame n+1 as frame n. Since the frame sizes are typically all different, the receiver will quickly lose synchronization on the frame boundary. The video quickly becomes unwatchable.

To resolve the issue, one possible solution is to inform the receiver about the dropped video frame indices. But this requires creating a connection between the end-devices and the middle-box (if the frame dropping is performed in the middle box). It further would needs to modify both the air-interface standards and the client devices to support this function. Therefore, this implies significant implementation challenge.

Instead, the present principles employ fragmented video. In a fragmented video, the video is divided into multiple small pieces of videos, each of which is called a fragment. A fragmented video still contains a media data box (mdat) and a movie box (moov), but the media data only contains a short header or nothing at all. To indicate that more fragments follow, the movie box must contain a movie extends box (mvex). Each fragment is then specified by its own movie fragment box (moot) and media data box (mdat). The video can be encoded using the fragmented video feature (or transcoded at the HTTP proxy), such that an entire fragment may be dropped if needed.

A further modification is needed so that the receiver can skip the dropped frame safely. Inside a movie fragment box there is a track fragment box containing a track fragment header box (tfhd). The tfhd box contains base-data-offset field, which specifies the absolute starting address (relative to the start of the video file) of the corresponding media data.

Therefore, if the current fragment is dropped, the receiver will miscalculate the starting address of the media data in the next fragment, due to the use of the absolute base-data-offset. The tfhd box also contains a field data-offset-present, which specifies whether the base-data-offset is present or not. If the data-offset-present is set to 0, the base-data-offset is not present and the receiver will use the starting address of the current fragment as the base-data-offset. By setting the data-offset-present to 0 and removing the base-data-offset field in the fragmented video file, each fragment can be dropped entirely without affecting other fragments. Since each fragment is a short piece of the video and the track information is just before the corresponding fragment, individual video frames can be dropped and track information can be modified before sending the entire fragment to the clients 104. This allows arbitrary frame dropping in the video.

Figure 3:
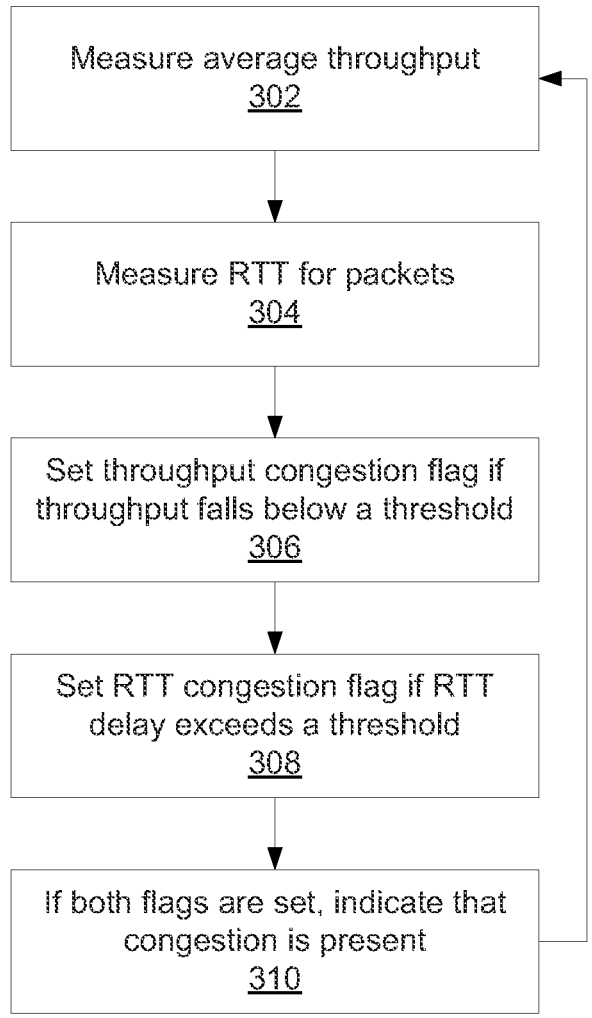
FIG. 3 is a block/flow diagram of a method for detecting network congestion from the flow control gateway in accordance with the present principles.

Referring now to FIG. 3, a method for determining congestion at the gateway 108 is shown. Whereas conventional techniques for flow management involve application layer optimizations on a per-flow basis based on TCP throughput for the flow, the present embodiments provide for radio network congestion detection that helps optimization tools at the gateway 108 to optimize across flow instances 206, providing greater efficiency and flexibility. By implementing congestion detection at the gateway 108, modifications to the base stations 102 and clients 104 can be avoided. Congestion is detected by considering both throughput and the round-trip time (RTT) for TCP packets.

Block 302 measures the average throughput of the gateway 108. Congestion is detected by monitoring all TCP flows/sessions through the gateway 108. The average throughput of a flow is measured as follows: Avg throughput=(Bytes_sent)/(Time_taken). Block 304 measures the RTT delay of packets in a flow, measured as a minimum RTT of packets in the flow.

Block 306 compares the average throughput to a throughput threshold. If the throughput falls below the throughput threshold, a throughput congestion flag is set. The throughput threshold is the minimum rate for a flow that can be obtained using the network policy set for that user 104 or using deep packet inspection to determine the needs of the application using the flow. For example, if a user 104 is streaming a video, then the average rate of that video can be used as the throughput threshold for that flow. Block 308 compares the RTT delay for a flow to an RTT threshold. If the RTT delay exceeds the threshold, then an RTT congestion flag is set. An appropriate value for the RTT threshold may be determined by computing the typical values of RTT while the base station is not congested. For example, a threshold between about 100 ms and 200 ms has been found to be suitable. The threshold value can also be updated while the system is running to adapt to changing network configurations.

If both the throughput congestion flag and the RTT congestion flag are set, then block 310 indicates that congestion is present. Considering both the throughput and the RTT delay ensures that the gateway 108 will not indicate congestion if the flows' throughput requirements are met. Since TCP greedily tries to maximize link utilization, the RTT for flows might indicate congestion while the average TCP rate is still sufficient for the application to achieve a good QoE.

The processing returns to block 302 to maintain current information regarding the congestion. The measurements of blocks 302 and 304 may also be made ongoing, to be reset on an interval that corresponds to, e.g., at least three times the worst case RTT delay of a flow. This allows sufficient time to both the TCP connection and the applications of each flow to adapt to changing conditions. For example, a video streaming application may lower its bitrate in response to congestion on the network. If an application can flexibly adapt to changing conditions on its own, then it may be unnecessary to move a user to a different slice.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Embodiments described herein may be entirely hardware, entirely software or including both hardware and software elements. In a preferred embodiment, the present invention is implemented in software, which includes but is not limited to firmware, resident software, microcode, etc.

Figure 4:
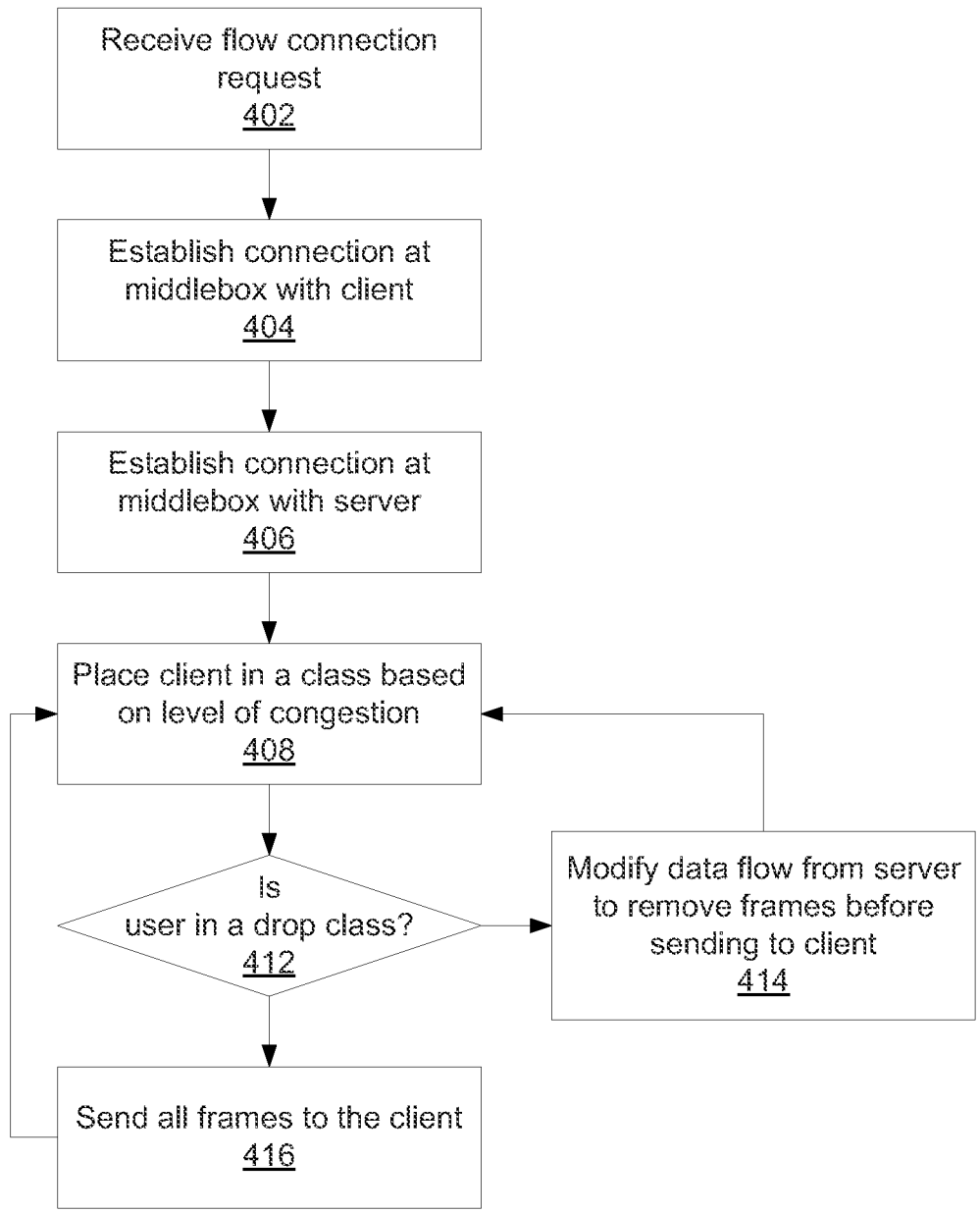
FIG. 4 is a block/flow diagram of a method for flow control using the detection of network congestion in accordance with the present principles.

Referring now to FIG. 4, a method for establishing connections for users is shown. At block 402, the gateway 108 receives a request from a user client 104 to establish a connection with a server. The gateway 108 establishes a connection with the client 104 in block 404 and establishes a separate connection with the server at block 406. The two connections may have separate queues or may share a queue. The gateway 108 determines what information sent by the server to pass on to the client 104.

At block 408, the gateway 108 determines a level of congestion and assigns the client's flow into one of the three classes described above, e.g., Regular, Drop, and Victim. Block 412 determines whether the user is in a Drop slice. If so, block 414 modifies the data flow received from the server before sending that flow along to the client. The gateway 108 removes frames from the flow so that the Drop user receives a flow that needs less throughput to maintain. In this case a user in the Victim slice may be considered a Drop user as well, as the Victim user will only receive data after the Regular and Drop users are satisfied. This may be implemented as dropping every frame of a Victim user's connection until such time as capacity becomes available. If the user is in the Regular class, block 416 simply forwards all frames received from the server to the client 104.

After handling the flow, or after some set period of time, processing returns to block 408 to reconsider the classification of the client. If a client 102 was placed in the Victim slice, then the client may be put in the Regular or Drop slice after a set period of time has elapsed to prevent the burden on the client 102 from being too large. By reevaluating user classifications, the gateway 108 can adapt to changing network conditions by moving existing flows into different classes.

Having described preferred embodiments of a system and method for flow management for data streams over cellular networks (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for data flow control, comprising:
    establishing a first connection between a gateway and a network client responsive to a connection request from the network client;
    establishing a second connection between the gateway and a server specified by the connection request;
    determining, with a processor, a user class for the network client based on a level of network congestion detected at the gateway based on whether both a throughput congestion flag and a round-trip-time (RTT) congestion flag are set, wherein the user class is one of a Regular class having a first guaranteed throughput, a Drop class having a second guaranteed throughput that is smaller than the first guaranteed throughput, and a Victim class that has no guaranteed throughput;
    modifying a data flow received at the gateway on the second connection to remove data from the data flow based on the determined user class of the network client; and
    transmitting the modified data flow to the network client via the first connection.

2. The method of claim 1, wherein determining the user class for the network client comprises assigning the network client to one of the Regular class, the Drop class, and the Victim class.

3. The method of claim 2, wherein modifying the data flow comprises dropping video frames from the data flow for Drop users.

4. the method of claim 3, wherein modifying the data flow comprises altering a container format of the data flow to accommodate the dropped video frames.

5. The method of claim 4, wherein the container format is MPEG-4 and modifying the data flow comprises providing a fragmented video flow on the first connection, wherein movie fragment boxes in the fragmented video flow include a track fragment header box having a starting address that takes the dropped video frames into account.

6. The method of claim 1, further comprising detecting the level of network congestion by determining whether a throughput available for the data flow falls below a throughput threshold and whether a round-trip-time (RTT) delay exceeds an RTT threshold.

7. The method of claim 6, wherein detecting the level of network congestion comprises:
    measuring an average throughput for a flow at the gateway;
    measuring RTT delay for packets in the flow at the gateway;
    setting the throughput congestion flag if the average throughput falls below the throughput threshold;
    setting the RTT congestion flag if the RTT delay exceeds the RTT threshold; and indicating that congestion is present if both the throughput congestion flag and the RTT congestion flag are set.

8. A system for data flow control, comprising:
    a first network controller configured to establish a first connection between a gateway and a network client responsive to a connection request from the network client;

a second network controller configured to establish a second connection between the gateway and a server specified by the connection request;

a slice manager comprising a processor, configured to determine a user class for the network client based on a level of network congestion detected at the gateway based on whether both a throughput congestion flag and a round-trip-time (RTT) congestion flag are set and to modify a data flow received at the gateway on the second connection to remove data from the data flow based on the determined user class of the network client, wherein the user class is one of a Regular class having a first guaranteed throughput, a Drop class having a second guaranteed throughput that is smaller than the first guaranteed throughput, and a Victim class that has no guaranteed throughput, wherein the first network controller transmits the modified data flow to the network client via the first connection.

9. The system of claim 8, wherein the slice manager is further configured to assign the network client to one of the Regular class, the Drop class, and the Victim class to determine the user class for the network client.

10. The system of claim 9, wherein the slice manager is further configured to drop video frames from the data flow for Drop users.

11. The system of claim 10, wherein the slice manager is further configured to after a container format of the data flow to accommodate the dropped video frames.

12. The system of claim 11, wherein the container format is MPEG-4 and the slice manager is further configured to provide a fragmented video flow on the first connection, wherein movie fragment boxes in the fragmented video flow include a track fragment header box having a starting address that takes the dropped video frames into account.

13. The system of claim 8, wherein the slice manager is further configured to detect the level of network congestion by determining whether a throughput available for the data flow falls a throughput threshold and whether a round-trip-time (RTT) delay exceeds an RTT threshold.

14. The system of claim 13, wherein the slice manager is further configured to measure an average throughput for a flow at the gateway, to measure RTT delay for packets in the flow at the gateway, to set the throughput congestion flag if the average throughput falls below the throughput threshold, to set the RTT congestion flag if the RTT delay exceeds the RTT threshold, and to indicate that congestion is present if both the throughput congestion flag and the RTT congestion flag are set.

* * * * *